United States Patent [19]

Chu et al.

[11] 4,401,572

[45] Aug. 30, 1983

[54] SELECTIVE ZEOLITE SORPTION OF GROUP V-B ELEMENT HYDRIDES AND DERIVATIVES THEREOF

[75] Inventors: Pochen Chu, West Deptford, N.J.; Francis G. Dwyer, West Chester, Pa.

[73] Assignee: Mobil Oil Corporation, New York, N.Y.

[21] Appl. No.: 274,971

[22] Filed: Jun. 18, 1981

Related U.S. Application Data

[63] Continuation-in-part of Ser. No. 94,608, Nov. 15, 1979, abandoned.

[51] Int. Cl.³ ............................................. B01D 15/04
[52] U.S. Cl. .................................... 210/681; 210/660
[58] Field of Search ................ 55/75, 389; 252/455 Z; 423/328, 87, 299, 352, 407; 210/660, 681

[56] References Cited

U.S. PATENT DOCUMENTS

| | | | |
|---|---|---|---|
| 3,723,308 | 3/1973 | Breck | 210/681 |
| 3,982,912 | 9/1976 | Yatsurugi et al. | 55/75 |
| 4,130,484 | 12/1978 | Marwil et al. | 55/75 |
| 4,329,233 | 5/1982 | van Aken et al. | 210/673 |

Primary Examiner—Ivars C. Cintins
Attorney, Agent, or Firm—Alexander J. McKillop; Charles J. Speciale; Dennis P. Santini

[57] ABSTRACT

A method for selectively sorbing Group V-B element hydrides and derivatives thereof from an aqueous solution containing same which comprises contacting said solution under ion-exchange conditions with a crystalline zeolite material having a pore dimension greater than about 5 Angstroms, a Constraint Index between 1 and 12 and a $SiO_2/Al_2O_3$ mole ratio greater than 12.

11 Claims, 1 Drawing Figure

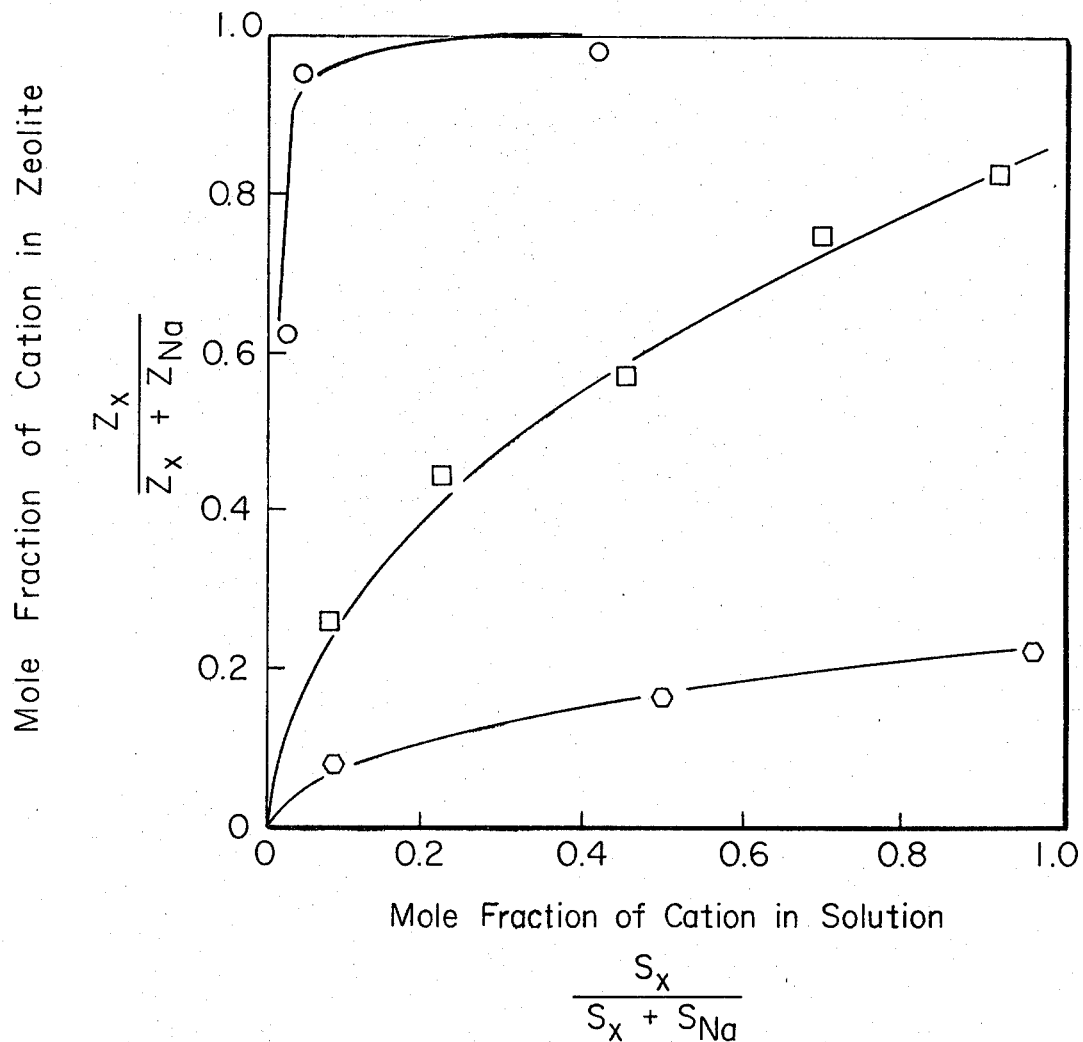

SELECTIVE ZEOLITE SORPTION OF GROUP V-B ELEMENT HYDRIDES AND DERIVATIVES THEREOF

CROSS-REFERENCE TO RELATED APPLICATIONS

This is a continuation-in-part of U.S. application Ser. No. 94,608, filed Nov. 15, 1979, now abandoned.

BACKGROUND OF THE INVENTION

1. Field of the Invention

This invention relates to the removal of pollutants from exhaust gases and waste water streams and more particularly to the selective sorption of Group V-B element hydrides and derivatives thereof by contact with crystalline zeolite materials.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li is equal to unity. One type of cation may often be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-38 (U.S. Pat. No. 4,046,859), and zeolite ZSM-23 (U.S. Pat. No. 4,076,842), merely to name a few.

The hydrides of Group V-B elements of the Periodic Chart of the Elements (Fisher Scientific Company Cat. No. 5-702-10, 1978) and their derivatives are important industrial chemicals, for example, ammonia, phosphine, alkylamines, and quaternary ammonium and quaternary phosphonium compounds. These compounds are unpleasant in odor and possess a varying degree of toxicity. Therefore, it is necessary to remove these materials from exhaust gases and waste water streams to meet air and water quality standards.

SUMMARY OF THE INVENTION

In accord with the present invention, it has been found that a very specific group of zeolites have exceptionally high selectivity toward and affinity for compounds of Group V-B elements, such as, for example, compounds of nitrogen, phosphorous, arsenic, antimony and bismuth, when in aqueous solution. For example, when a quantity of zeolite ZSM-5 is brought into contact with an aqueous solution mixture of tetramethylammonium and Na ions, only tetramethylammonium ions are selectively adsorbed on the ZSM-5. Methylamine has also been removed exclusively by this specific type zeolite from an aqueous solution mixture.

The synthetic crystalline zeolite materials employable in this invention are those having a Constraint Index between 1 and 12 and a $SiO_2/Al_2O_3$ mole ratio greater than 12, e.g. the zeolites ZSM-5, ZSM-11, ZSM-12, ZSM-23, ZSM-35, ZSM-38 and ZSM-48 (described in copending U.S. application Ser. No. 303,276, filed Sept. 17, 1981).

BRIEF DESCRIPTION OF THE DRAWING

The FIGURE drawing is a comparative plot of representative ion exchange isotherms of one of the zeolites useful herein, e.g. ZSM-5, at 25° C.

DESCRIPTION OF SPECIFIC EMBODIMENTS

The present invention is directed to selective sorption of the hydrides of Group V-B elements, and their derivatives, non-limiting examples as aforementioned, by contact with specific crystalline zeolite materials exemplified by zeolites ZSM-5, ZSM-11, ZSM-12, ZSM-23, ZSM-35, ZSM-38 and ZSM-48.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the desired type. Windows of 10-membered rings are preferred, although, in some instances, excessive puckering or pore blockage may render these catalysts ineffective. Twelve-membered rings do not generally appear to offer sufficient constraint to produce the advantageous selective sorption. Also, structures can be conceived which may be inoperative due to pore blockage or other cause.

Rather than attempt to judge from crystal structure whether or not a particular zeolite composition possesses the necessary constrained access, a simple determination of the "Constraint Index" may be made by continuously passing a mixture of an equal weight of normal hexane and 3-methylpentane over a small sample, approximately 1 gram or less, of zeolite composition at atmospheric pressure according to the following procedure. A sample of the zeolite composition, in the form of pellets or extrudate, is crushed to a particle size about that of coarse sand and placed in a glass tube. Prior to testing, the zeolite composition is treated with a stream of air at 1000° F. for at least 15 minutes. The zeolite composition is then flushed with helium and the temperature adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite composition per hour) over the zeolite composition with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index in the approximate range of 1 to 12. Constraint Index (CI) values for some typical zeolites, including those useful herein, are:

| Crystalline Aluminosilicate | C I |
|---|---|
| ZSM-5 | 8.3 |
| ZSM-11 | 8.7 |
| ZSM-12 | 2 |
| ZSM-23 | 9.1 |
| ZSM-38 | 2 |
| ZSM-35 | 4.5 |
| ZSM-48 | 3.4 |
| TMA Offretite | 3.7 |
| Beta | 0.6 |
| ZSM-4 | 0.5 |
| H—Zeolon | 0.5 |
| REY | 0.4 |
| Erionite | 38 |

It is to be realized that the above CI values typically characterize the specified zeolites but that such are the cumulative result of several variables used in determination and calculation thereof. Thus, for a given zeolite exhibiting a CI value within the range of 1 to 12, depending on the temperature employed within the aforenoted range of 550° F. to 950° F., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood by those skilled in the art that the CI, as utilized herein, while affording a highly useful means for characterizing the zeolites of interest is approximate, taking into consideration the manner of its determination, with the probability, in some instances, of compounding variable extremes. However, in all instances, at a temperature within the above-specified range of 550° F. to 950° F., the CI will have a value for any given zeolite of interest herein within the approximate range of 1 to 12.

Zeolite ZSM-5 is taught by U.S. Pat. No. 3,702,886, issued Nov. 14, 1972, the disclosure of which is incorporated herein by reference. In a preferred syntheized form, the zeolite ZSM-5 for use in the zeolite composition useful in this invention has a formula, in terms of mole ratios of oxides in anhydrous state, as follows:

$$(0.9 \pm 0.2)M_{2/n}O:Al_2O_3:xSiO_2$$

wherein M is selected from the group consisting of a mixture of alkali metal cations, especially sodium, and tetraalkylammonium cations, the alkyl groups of which preferably contain 2 to 5 carbon atoms, and x is at least 5. Particularly preferred is a zeolite having the formula in the anhydrous state as follows:

$$(0.9 \pm 0.2)M_{2/n}O:Al_2O_3:ZSiO_2$$

wherein Z is from greater than 30 to about 350 or higher.

Zeolite ZSM-11 is taught by U.S. Pat. No. 3,709,979, issued Jan. 9, 1973, the disclosure of which is incorporated herein by reference. In the as synthesized form, the zeolite ZSM-11 for use in the zeolite composition useful in this invention has a formula, in terms of mole ratios of oxides in the anhydrous state, as follows:

$$(0.9 \pm 0.3)M_{2/n}O:Al_2O_3:zSiO_2$$

wherein M is a mixture of at least one of the quaternary cations of a Group V-B element of the Periodic Table (as above identified) and alkali metal cations, especially sodium, and z is at least 10. The original cations can be present so that the amount of quaternary cations is between 10 and 90 percent of the total amount of the original cations. Thus, the zeolite can be expressed by the following formula in terms of mole ratios of oxides:

$$(0.9 \pm 0.2)(xXR_4 + (1-x)M_{2/n}O):Al_2O_3:zSiO_2$$

wherein R is an alkyl or aryl group having between 1 and 7 carbon atoms, M is an alkali metal cation, X is a Group V-B element, especially a metal, and x is between 0.1 and 0.9, and z is at least 10.

Zeolite ZSM-12 is taught by U.S. Pat. No. 3,832,449, issued Aug. 27, 1974, the disclosure of which is incorporated herein by reference. In the as synthesized form, the zeolite ZSM-12 for use in the zeolite composition useful in this invention has a formula, in terms of mole ratios of oxides in the anhydrous state, as follows:

$$(0.9 \pm 0.3)M_{2/n}O:Al_2O_3:wSiO_2$$

wherein M is at least one cation having the valence n, w is at least 20, and has a characteristic X-ray diffraction pattern.

Zeolite ZSM-23 is taught by U.S. Pat. No. 4,076,842, the disclosure of which is incorporated herein by reference. As synthesized, the zeolite ZSM-23 for use herein has a formula, in term of mole ratios of oxides in the anhydrous state as follows:

$$(0.58 \text{ to } 3.4)M_{2/n}O:Al_2O_3:(40 \text{ to } 250)SiO_2$$

wherein M is at least one cation having a valence n, and has a characteristic X-ray diffraction pattern. It is noted that the ratio of $M_{2/n}O$ may exceed unity in this material, probably due to occlusion of excess organic species, used in its preparation, within the zeolite pores.

In a preferred synthesized form, zeolite ZSM-23 has a formula, in tens of mole ratios of oxides in the anhydrous state as follows:

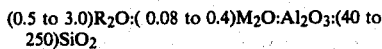(0.5 to 3.0)$R_2O$:( 0.08 to 0.4)$M_2O$:$Al_2O_3$:(40 to 250)$SiO_2$ wherein R is a nitrogen-containing organic cation, such as, for example, one derived from pyrrolidine, and M is an alkali metal cation, such as, for example, sodium.

Zeolite ZSM-35 is described by U.S. Pat. No. 4,016,245, the disclosure of which is incorporated herein by reference. This zeolite can be identified, in terms of mole ratios of oxides and in the anhydrous state, as follows:

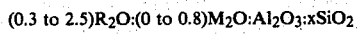(0.3 to 2.5)$R_2O$:(0 to 0.8)$M_2O$:$Al_2O_3$:$xSiO_2$ wherein R is an organic cation, M is an alkali metal cation and x is greater than 8, and is characterized by a specified X-ray powder diffraction pattern.

In a preferred synthesized form, zeolite ZSM-35 has a formula, in terms of mole ratios of oxides and in the anhydrous state, as follows:

(0.4 to 2.5)$R_2O$:(0 to 0.6)$M_2O$:$Al_2O_3$:$ySiO_2$ wherein R is an organic nitrogen-containing cation derived from ethylenediamine, pyrrolidine, butanediamine or an N-methylpyridinium compound, such as, for example, the hydroxide, halide, sulfate or nitrate, M is an alkali metal, especially sodium, and y is from greater than 8 to about 50.

Zeolite ZSM-38 is described in U.S. Pat. No. 4,046,859, the disclosure of which is incorporated herein by reference. This zeolite can be identified, in terms of mole ratios of oxides and in the anhydrous state, as follows:

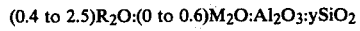(0.3 to 2.5)$R_2O$:(0 to 0.8)$M_2O$:$Al_2O_3$:$xSiO_2$ wherein R is an organic cation, M is an alkali metal cation and x is greater than 8, and is characterized by a specified X-ray powder diffraction pattern.

In a preferred synthesized form, zeolite ZSM-38 has a formula, in terms of mole ratios of oxides and in the anhydrous state, as follows:

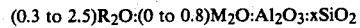(0.4 to 2.5)$R_2O$:(0 to 0.6)$M_2O$:$Al_2O_3$:$ySiO_2$ wherein R is an organic nitrogen-containing cation derived from a 2-(hydroxyalkyl) trialkylammonium compound, wherein alkyl is methyl, ethyl or a combination thereof, M is an alkali metal, especially sodium, and y is from greater than 8 to about 50.

Zeolite ZSM-48 can be identified, in terms of moles of anhydrous oxides per 100 moles of silica as follows:

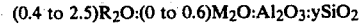(0 to 15)RN:(0 to 1.5)$M_{2/n}O$:(0 to 2)$Al_2O_3$:(100)$SiO_2$ wherein M is at least one cation having a valance n, RN is a $C_1$–$C_{20}$ organic compound having at least one amine functional group of $pK_2a$ greater than or equal to 7, and wherein the composition is characterized by the distinctive X-ray diffraction pattern as shown in Table 1 below.

It is recognized that, particularly when the composition contains tetrahedral framework aluminum, a fraction of the amine functional groups may be protonated. The doubly protonated form, in conventional notation, would be $(RNH)_2O$ and is equivalent in stoichiometry to $2RN+H_2O$.

The original cations can be replaced, at least in part, by calcination and/or ion exchange with another cation. Thus, the original cations are exchanged into a hydrogen or hydrogen ion precursor form or a form in which the original cation has been replaced by a metal of Groups II through VIII of the Periodic Table.

The X-ray diffraction pattern of the ZSM-48 for use in the present invention has the following significant lines:

TABLE 1

| Significant Lines of ZSM-48 | |
|---|---|
| d(A) | Relative Intensity |
| 11.8 ± 0.2 | W-VS |
| 10.2 ± 0.2 | W-M |
| 7.2 ± 0.15 | W |
| 4.2 ± 0.08 | VS |
| 3.9 ± 0.08 | VS |
| 3.6 ± 0.06 | W |
| 3.1 ± 0.05 | W |
| 2.85 ± 0.05 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. In Table 1 the relative intensities are given in terms of the symbols W=weak, M=medium and VS=very strong. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

Zeolites ZSM-5, ZSM-11, ZSM-12, ZSM-23, ZSM-35 and ZSM-38 for use herein are prepared as indicated in their respective patents, incorporated herein by reference.

Zeolite ZSM-48 can be suitably prepared from a reaction mixture containing a source of silica, RN, an alkali metal oxide, e.g. sodium, water, and optionally alumina, and having a composition, in terms of mole ratios of oxides, falling within the following ranges:

| REACTANTS | | BROAD | PREFERRED |
|---|---|---|---|
| $Al_2O_3/SiO_2$ | = | 0 to 0.02 | 0 to 0.01 |
| $Na/SiO_2$ | = | 0 to 2 | 0.1 to 1.0 |
| $RN/SiO_2$ | = | 0.01 to 2.0 | 0.05 to 1.0 |
| $OH^-/SiO_2$ | = | 0 to 0.25 | 0 to 0.1 |
| $H_2O/SiO_2$ | = | 10 to 100 | 20 to 70 |
| $H^+(added)/SiO_2$ | = | 0 to 0.2 | 0 to 0.05 | wherein RN is a $C_1$–$C_{20}$ organic compound having at least one amine functional group of $pK_a$ greater than or equal to 7, and maintaining the mixture at 80°–250° C. until crystals of the zeolite are formed. $H^+$(added) is moles acid added in excess of the moles of hydroxide added. In calculating $H^+$(added) and $OH^-$ values, the term acid ($H^+$) includes both hydronium ion, whether free or coordinated, and aluminum. Thus, aluminum sulfate, for example, would be considered a mixture of aluminum oxide, sulfuric acid, and water. An amine hydrochloride would be a mixture of amine and HCl.

The above zeolites can be used either in the alkali metal form, e.g. the sodium form, the ammonium form, the hydrogen form or another univalent or multivalent form. When used as catalysts they will be subjected to thermal treatment (calcination) for activation. When used as a selective sorbent, as in this invention, calcination can be omitted. Typical ion-exchange techniques mentioned herein may be found described in U.S. Pat. Nos. 3,140,249; 3,140,251; and 3,140,253.

Ion selectivity of a zeolite for one of two competing cations can be expressed by the separation factor $$\alpha_B^A = Z_A S_B / Z_B S_A$$

where $\alpha_B^A$ is the separation factor of ion A over ion B, and $Z_A$, $Z_B$, $S_A$ and $S_B$ are ionic fractions of A and B in the zeolite and solution phases respectively. The separation factor is very convenient for practical applications; it is dependent on total concentration of the exchange solution and the temperature. We have determined the separation factors for condition of 0.1N mixed salt solution, $S_A = S_B = 0.5$ at 25° C. with 24 hour equilibration. The degree of exchange was found by detailed analysis of both zeolite and solution phases.

The separation factor of various cations are listed in Table 2. Three representative isotherms (TMA+, Zn$^{2+}$, and La$^{3+}$) are shown in FIG. 1. From these isotherms, the separation factor of these ions at ionic fractions other than $S_A = S_B = 0.5$ can also be calculated.

The exceptionally selective tetramethylammonium ion (TMA) can replace all Na ions in pre-calcined ZSM-5 with great ease.

TABLE 2

| Separation Factor $\alpha_{Na}^x$ of ZSM-5 at 25° C. | |
|---|---|
| Ions (x) | $\alpha_{Na}^x$ ($S_x = S_{Na} = 0.5$) |
| Monovalent | |
| TMA | 190 |
| Cs | 20 |
| H$_3$O | 18 |
| NH$_4$ | 13 |
| K | 5.2 |
| Ag | 3.3 |
| Na | 1.0 |
| Li | 0.6 |
| Divalent | |
| Ba | 0.24 |
| Ca | 0.07 |
| Mg | 0.11 |
| Zn | 1.7 |
| Ni | 0.6 |
| Trivalent | |
| Al | low |
| La | 0.22 |

Zeolite: ZSM-5, precalcined at 1000° F. for three hours in N$_2$. Solution: 0.1N mixed salt solution of chlorides. In case of Ag+, nitrate was used instead.

In order to more fully illustrate the nature of the invention and the manner of practicing same, the following non-limiting examples are presented.

EXAMPLE 1

An ion selectivity scoping study was done on ZSM-5 in its precalcined form. The ion selectivity is shown in Table 2. The capacity of the zeolite sample amounted to 0.42 meq/g. ZSM-5 was thereby shown to be very selective for TMA ions.

EXAMPLE 2

Extrudates of Na ZSM-5 were made by extruding a 65/35 mixture of as synthesized ZSM-5 and alumina. The extrudates were precalcined 3 hours at 1000° F. with nitrogen gas flow to decompose the organics inside the zeolite. The sodium content was analyzed to be 0.7% by weight.

Ten grams of the above Na ZSM-5 extrudates were equilibrated with 100 ml of 0.1N CH$_3$NH$_3$Cl for 2 hours at ambient temperature. The extrudates were then separated from the solution, water washed and dried. Analysis of these extrudates proved them to contain 0.03% Na and 0.46% N by weight, indicating that the CH$_3$NH$_3$+ was selectively sorbed by the zeolite.

Ten grams of the same Na ZSM-5 extrudates were equilibrated with 100 ml of 0.1N (CH$_3$)$_2$NH$_2$Cl solution for 2 hours at ambient temperature. Analysis of these extrudates provided them to contain 0.45% N and 0.04% Na, indicating that the (CH$_3$)$_2$NH$_2$Cl was selectively sorbed by the zeolite.

EXAMPLE 3

Extrudates of HZSM-11 were made by extruding a 65/35 mixture of ZSM-11 zeolite and alumina. The extrudates were precalcined 3 hours at 1000° F. with nitrogen gas flow, followed by exchange with NH$_4$NO$_3$ solution to reduce Na to 0.02% by weight. Final calcination of extrudate was 3 hours at 1000° F. to obtain the H form.

Ten grams of the above HZSM-11 extrudates were equilibrated with a mixed solution of 100 ml of 0.1N TMACl and 100 ml of 0.1 N NaCl. The extrudates were separated from the solution, water washed and dried after 24 hours of equilibration at ambient temperature. The analysis of these extrudates found that they contained 0.42% N and 0.01% Na. The mole ratio of TMA/Na was calculated to be 49 based on the analysis, indicating that ZSM-11 has high affinity for TMA ions.

EXAMPLE 4

Ten grams of the same HZSM-11 extrudates of Example 3 were equilibrated with a mixed solution of 100 ml each of 0.1N methylamine and 0.1 N NaCl for 24 hours at ambient temperature. The extrudates were then separated from the solution, water washed and dried. The extrudates were analyzed finding 1.05% N and 0.67% Na. The mole ratio of CH$_3$NH$_3$/Na was 2.6, indicating high selectivity for methylamine.

EXAMPLE 5

Extrudates of HZSM-12 were prepared according to the procedure described in Example 3. Ten grams of the HZSM-12 extrudates were equilibrated with a mixed solution of 100 ml of 0.1 N TMACl and 100 ml of 0.1 N NaCl. After 24 hours of equilibration at ambient termperature, the extrudates were separated from the solution, water washed and dried. The extrudates were analyzed finding 0.32% N and 0.03% Na by weight. The mole ratio of TMA/Na was calculated to be 7.5, indicating high selectivity for TMA ions.

EXAMPLE 6

Ten grams of the HZSM-12 extrudates described in Example 5 were equilibrated with a mixed solution of 100 ml each of 0.1 N methylamine and 0.1 N NaCl at ambient temperature for 24 hours. The extrudates were then separated from the solution, water washed and dried. The extrudates were analyzed finding 0.94% N and 0.55% Na by weight. The mole ratio of $CH_3NH_3$/Na ratio was calculated to be 2.8, indicating high selectivity for methylamine.

EXAMPLE 7

A pure HZSM-5 sample was prepared by calcining the "as synthesized" ZSM-5 crystal in $N_2$ at 1000° F. for 3 hours. The calcined sample was ion-exchanged with $NH_4NO_3$ solution to reduce the Na content in the zeolite to less than 0.02% by weight. The sample was then slugged and sized to 14/20 mesh and calcined again in air at 1000° F. for 3 hours to remove all C and N in the sample. Ten grams of the sample was equilibrated with a mixed solution of 100 ml of 0.1 N methylamine and 100 ml of 0.1 N NaCl at ambient temperature for 24 hours. The sample was then separated from the solution, water washed and dried. The solid sample was analyzed to find 0.45% N and 0.2% Na by weight. The mole ratio of $CH_3NH_3$/Na was calculated to be 11.9, indicating high selectivity for methylamine.

EXAMPLE 8

A sample of zeolite ZSM-35 was prepared by calcining the "as synthesized" ZSM-35 in nitrogen flow at 1000° F. for 3 hours to decompose the organics. The calcined sample was ion-exchanged with $NH_4NO_3$ to reduce the sodium content to less than 0.02%. The sample was calcined again in air for 3 hours at 1000° F. The product contained 0.02% Na and traces of N and C.

Ten grams of the HZSM-35 sample was equilibrated in a mixed solution of 100 ml of 0.1 N TMACl solution and 100 ml of 0.1 N NaCl solution at ambient temperature for 24 hours. The zeolite sample was separated from the solution, water washed and dried. The zeolite was analyzed and found to contain 0.41% N and 0.26% Na by weight. The TMA/Na mole ratio was calculated to be 3.6 in the zeolite, indicating its selectivity for TMA.

The foregoing descriptions are equally applicable to, and include, the other elements in Group V-B as well, to wit, P, As, Sb and Bi.

By the exercise of the present invention, all of the used and pollutant-saturated catalysts can be regenerated and employed repeatedly. The regeneration starts with low temperature (500° F.) and low concentration oxygen gas stream (about 0.5%, balance nitrogen) and increases to 1000° F. and full air stream to prevent any heat damage to the zeolitic material.

The tightening restrictions of environmental laws will keep the demand for specific, efficient and economic processes for clean-up of waste water and gas streams high. The zeolites for use in the present invention will play an important role in this respect for their unique ability to adsorb selectively the hydrides and their derivatives of Group V-B elements.

What is claimed is:

1. A method for selectively sorbing hydrides of Group V-B elements of the Periodic Chart of the Elements and derivatives thereof from an aqueous solution containing same which comprises contacting said solution under ion-exchange conditions with a crystalline zeolite material having a pore dimension greater than about 5 Angstroms, a Constraint Index between 1 and 12 and a $SiO_2/Al_2O_3$ mole ratio greater than 12.

2. A method according to claim 1 wherein said crystalline zeolite material is selected from the group consisting of zeolites having the structure of ZSM-5, ZSM-11, ZSM-12, ZSM-23, ZSM-35, ZSM-38 and ZSM-48.

3. A method according to claim 2 wherein said crystalline zeolite material has the structure of zeolite ZSM-5.

4. A method according to claim 2 wherein said crystalline zeolite material has the structure of zeolite ZSM-11.

5. A method according to claim 2 wherein said crystalline zeolite material has the structure of zeolite ZSM-12.

6. A method according to claim 2 wherein said crystalline zeolite material has the structure of zeolite ZSM-23.

7. A method according to claim 2 wherein said crystalline zeolite material has the structure of zeolite ZSM-35.

8. A method according to claim 2 wherein said crystalline zeolite material has the structure of zeolite ZSM-38.

9. A method according to claim 2 wherein said crystalline zeolite material has the structure of zeolite ZSM-48.

10. A method according to claim 1 wherein said Group V-B element is nitrogen, phosphorus, arsenic, antimony or bismuth.

11. A method according to claim 1 wherein said Group V-B element is nitrogen.

* * * * *